(12) United States Patent
Collette (10) Patent No.: US 7,319,638 B2
(45) Date of Patent: Jan. 15, 2008

(54) HYDRAULIC OSCILLATOR FOR USE IN A TRANSMITTER VALVE

(76) Inventor: Herman D. Collette, P.O. Box 60605, Houston, TX (US) 77205

( * ) Notice: Subject to any disclaimer, the term of this patent is extended or adjusted under 35 U.S.C. 154(b) by 275 days.

(21) Appl. No.: 11/162,308

(22) Filed: Sep. 6, 2005

(65) Prior Publication Data

US 2007/0052550 A1    Mar. 8, 2007

(51) Int. Cl.
*G01V 3/00* (2006.01)
(52) U.S. Cl. .............. 367/83; 367/85; 340/854.4; 340/853.1; 251/318; 251/321; 175/38
(58) Field of Classification Search .......... 340/853.1, 340/854.4; 367/83, 85; 251/318, 321; 175/38
See application file for complete search history.

(56) References Cited

U.S. PATENT DOCUMENTS

| 4,908,804 A | 3/1990 | Rorden |
| 5,390,153 A | 2/1995 | Scherbatskoy |
| 5,586,084 A | 12/1996 | Barron et al. |
| 6,233,524 B1 | 5/2001 | Harrell et al. |
| 6,839,000 B2 * | 1/2005 | Das et al. ............... 340/853.1 |
| 6,867,706 B2 | 3/2005 | Collette |
| 6,898,150 B2 * | 5/2005 | Hahn et al. .................... 367/85 |
| 7,145,834 B1 * | 12/2006 | Jeter ........................... 367/83 |
| 7,180,826 B2 * | 2/2007 | Kusko et al. ................. 367/85 |

* cited by examiner

*Primary Examiner*—Albert K. Wong
(74) *Attorney, Agent, or Firm*—Law Office of Tim Cook P.C.

(57) ABSTRACT

An oscillating valve driven by the pressure in a mud pulser develops a pressure variation in the mud pulse signal that is at a frequency that is different than the frequencies of the mud system. The oscillating valve is coupled to or integral with the pulse drive cylinder, whether the drive means for operation of the pulser is upstream or downstream from the orifice. A bistable valve improves performance of the transmitting element at low flow rates by providing a toggle mechanism which assures positive seating of the bistable valve.

9 Claims, 5 Drawing Sheets

HYDRAULIC OSCILLATOR FOR USE IN A TRANSMITTER VALVE

FIELD OF THE INVENTION

The present invention relates generally to the field of measuring while drilling (MWD) systems, and, more particularly, to a system which provides repeated, cyclic pressure oscillations for the transmission of data from sensors to receivers located at some distance removed and connected to the transmitter by a conduit.

BACKGROUND OF THE INVENTION

Remotely operated sensor packages have been used during the drilling of wells for a number of years. Similar systems are used in sewer line cleaning systems. The sensor packages are commonly found in applications where information such as the inclination, azimuth, and various logging sensor measurements are of interest.

During well drilling operations, drilling fluid, known in the art as drilling mud, is typically pumped down through the drill pipe and then through the drill bit to clean, lubricate, and cool the bit. The drilling fluid then returns to the surface by way of the annulus between the drill pipe and the bore hole or casing, where the drilling mud is cleaned of cuttings so that the drilling fluid can be re-used. Sewer cleaning systems generally employ an open ended system where fluid is pumped down a conduit and exits a bit or cleaning head and drains through the system.

In the case of drilling wells, it was established as early as 1942 that the flowing drilling fluid could be used as a transmission medium for data developed down hole during drilling operations, thus the origin of the term "measuring while drilling". To transmit information, a device was created that varied the pressure of the drilling fluid in the drill pipe by placing an orifice in the drill string and inserting a poppet into the orifice to form a "pulser". By repeated insertion and removal of the poppet, a series of pressure increases was created in the drilling fluid that could be detected at the surface and used to convey information. Unfortunately, these pressure increases were of relatively low frequency, generally resulting in a pressure pulse with a rise time of 20-200 milliseconds, a duration of 0.25 to 3 seconds, and a fall time of 20-200 milliseconds. The resulting frequency spectral content of the pulses created down hole was concentrated at frequencies below 20 Hz with the centroid of spectral energy below 3 Hz, and a peak energy centered in the range of 0.1 to 1.5 Hz.

In addition to severely limiting the data transmission rate, these low frequencies coincide with the noise frequencies generated during drilling. One common technique for improving the signal to noise ratio is to filter the noise. Unfortunately, conventional filtering, which is used to eliminate drilling noise, also removes much of the remaining energy from the transmitted pulse.

To overcome this shortcoming, the amplitude of the induced pressure pulses was increased. However, erosion of the poppet and orifice by the pressure pulses is a function of the imposed pressure drop. Thus, increasing the pressure drop decreased pulser life. Another problem with simply increasing the amplitude of the induced pressure pulses was the power required to create such pulses. The large power demand meant a large and more powerful prime mover to operate the poppet, and this meant greater weight and cost for the MWD system.

Therefore, in my previous U.S. Pat. No. 6,867,706, I taught a method of modifying the design of positive fluid pulsers that shifted the frequency of the signal away from the region of substantial drilling noise thereby reducing the requirement for the high pressure pulses. In the '706 patent, I also taught a method of generating and varying oscillating pressure signals in the drilling fluid thereby facilitating higher data transmission rates.

While the structure and method shown and described in the '706 patent have been successful, the oscillator shown and described does not function well at low flow rates for the conduit conveyed fluid. At low flow rate, the pressure differential across the oscillator is low, and if this differential falls below a certain differential pressure, the bistable valve prematurely lifts off the seat. This lift increases the leakage of the bistable valve and may result in a leakage rate insufficient to engage the secondary spring means. The present invention resolves this drawback in the art as taught in my '706 patent. In addition, the present invention provides a means to hold the device in an on-pulse or an off-pulse state facilitating a hydraulic means of accomplishing the equivalent of radio frequency interrupted continuous wave transmission.

SUMMARY OF THE INVENTION

The present invention addresses these and other drawbacks in the art by employing a secondary mechanical 'sense piston' that forces a positive bystable valve state transition. A second latch means is used to preferentially lock the sense piston in one of two states providing either an high pressure poppet position or a low pressure poppet position. Alternatively, the latch means can be disengaged and the oscillator action will be observed.

These and other features of the present invention will be immediately apparent to those skilled in the art from a review of the following description along with the accompanying drawings.

DETAILED DESCRIPTION OF A PREFERRED EMBODIMENT

Figure 1:
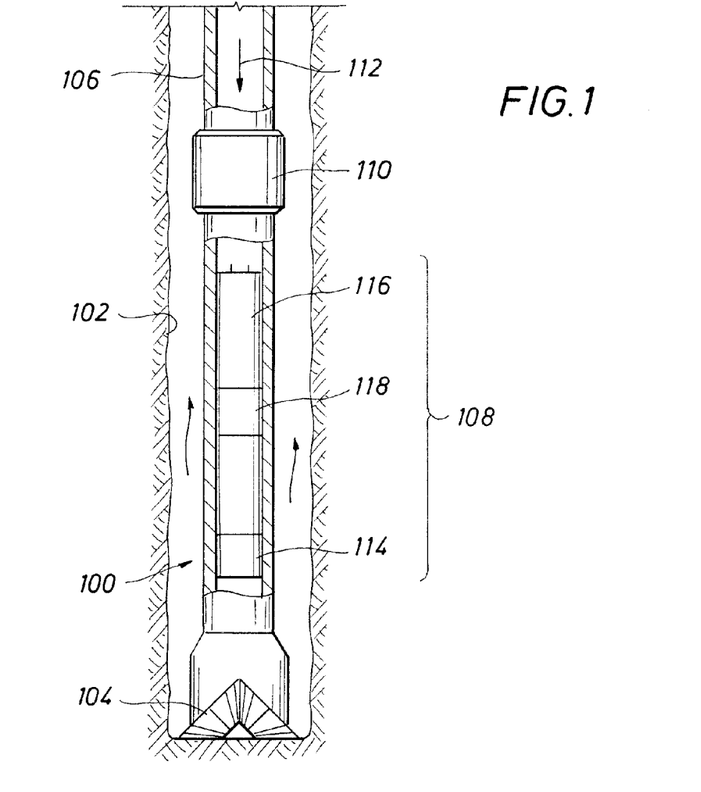
FIG. 1 is a sectional view of a typical drilling system in which the present invention finds application.

FIG. 1 illustrates a basic drilling system 100 in a bore hole 102 formed by a typical drill bit 104. The drill bit 104 is driven by a drill pipe 106 which joins to a bottom hole assembly 108 with a coupling 110. Drilling mud flows down through the drill pipe 106, as shown by an arrow 112, through the bottom hole assembly 108, through the drill bit 104 and back to the surface by way of the annulus between the drill pipe and the bore hole.

In drilling applications, the bottom hole assembly 108, between the coupling 110 and the drill bit 104, is where the present invention finds application. The bottom hole assembly 108 includes one or more sensors 114 adapted to measure parameters of interest. The sensor(s) 114 provide a sensor signal to a transmitter 116 which includes a pulser 118. The transmitter 116 and pulser 118 vary the pressure in the drilling fluid, which variation is detected at the surface and interpreted to provide the measured data at the surface. These sensors provide an output to a control unit (not illustrated) which drives the mud transmitter containing components of pulser 188 and a bistable valve. The known pulser of FIG. 1 is illustrated for background purposes to illustrate the environment in which the present invention finds application.

Figure 2A:
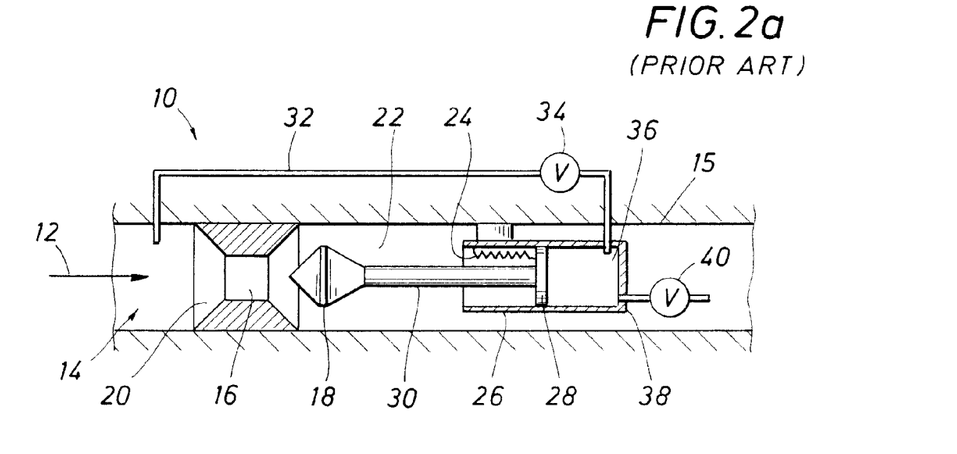
FIGS. 2a, 2b, and 2c are elevational views in partial section of known pulsers with the poppet and orifice in various known configurations.
Figure 2B:
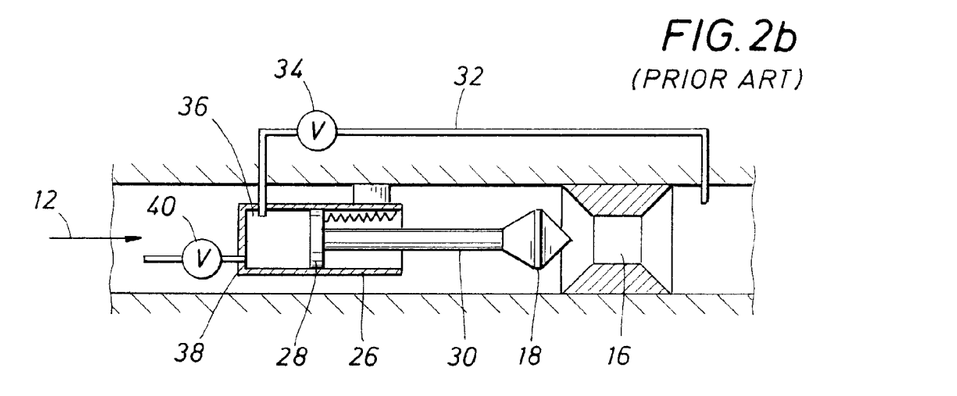

FIG. 2a depicts a hydraulic schematic of a known bottom driven positive pulse MWD pulser 10. In FIG. 2a, flow of the drilling fluid, indicated by an arrow 12, enters the pulser at an inlet 14, from the direction indicated. In the type of pulser illustrated, an orifice 16 is located upstream of a poppet 18, although the poppet may preferably be placed upstream of the orifice, as shown in FIG. 2b. A pressure differential is created across the orifice 16 from an upstream region 20 to a region 22 downstream of the poppet, even when the poppet 18 is in a retracted position as shown in FIG. 2a. The poppet and orifice are enclosed within a housing 15, which is preferably a cylindrical or tubular housing. This housing may also be a structural component of the drill string.

To insure this pressure differential is sufficient for regenerative operation, a spring 24 has one end either attached to a cylinder 26 and the other end to a drive piston 28 or a spring 24 compressed in such a way as to apply some force countering the flow forces on the poppet and forcing the poppet toward the orifice 16. A portion of higher pressure fluid in the region 20 can be permitted to enter the drive cylinder 26, behind the drive piston 28, which is coupled through a drive rod 30 to the poppet 18. The region 20 is therefore hydraulically coupled to the cylinder 26 through a gallery 32. This flow maybe interrupted, however, by a pilot valve 34. By opening the pilot valve 34, a chamber 36 behind the drive piston 28 is allowed to approach the pressure of region 20. It will be understood by those skilled in the art that the poppet, drive cylinder, and piston arrangement depicted in FIG. 2 could as well be positioned upstream of the orifice 16, as will be described below.

A secondary opening defining a bleed bore 38 is installed in the chamber 36 to serve as a controlled leak or an operating valve that allows an equilibrium to be established between the force behind drive piston 28 and the force of the drilling mud impinging on the poppet 18 as a result of fluid movement and the difference in pressure between the regions 20 and 22. The secondary opening 38 also allows pressure within the chamber 36 to return to downstream pressure at region 22 when the pilot valve 34 is closed. This reduction in pressure allows the drive piston 28, the connecting rod 30, and the poppet 18, to return to an off pulse position. A pressure relief valve 40 is employed to effectively maintain the pressure in the drive cylinder so that the pulses are of constant amplitude regardless of flow rate.

Figure 2C:
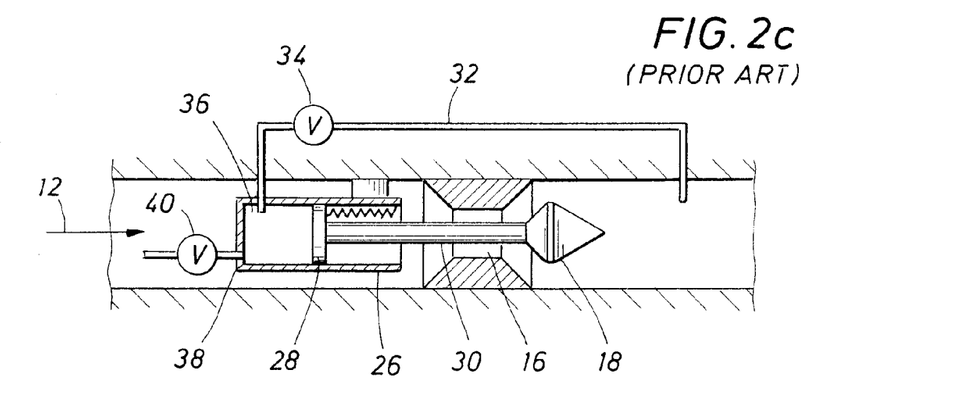

FIGS. 2b and 2c depict other configurations of a known pulser, and like structural components are provided with like element numbers. In FIG. 2b, the poppet 18 is positioned upstream of the orifice 16. One drawback of the configuration of FIG. 2b is that fluid flow as shown exerts a closing force on the poppet against the orifice, a force which must be overcome in retuning the poppet to the retracted position. This drawback is overcome by the configuration of FIG. 2c by placing the actuator upstream of the orifice while placing the poppet downstream of the orifice. However, the configuration of FIG. 2c includes the drawback of the rod 30 going through the orifice, and thereby taking up some of the cross sectional area for fluid flow through the tool. It is to understood by those skilled in the art that the present invention may be used effectively without further adaptation with any of the configurations of FIGS. 2a, 2b, and 2c.

Assuming that the pilot valve 34 allows upstream pressure into drive cylinder 26, the force on the piston 28 within the drive cylinder 36 such as is illustrated in FIG. 2, is given by the equation:

$$\text{Force} = \text{Piston Area} * (P_{20} - P_{22}),$$

where $P_{20}$ is the pressure at region 20 and $P_{22}$ is the pressure at region 22.

The pulser thus far described provides one poppet position (i.e. one level of back pressure) for a logical "1", and another poppet position (i.e. another level of back pressure) for a logical "0". As previously described, the frequencies produced by this arrangement can be masked by the background noise of the mud system, such as for example by the mud pump providing the drilling fluid flow, and other background noise. The invention shown and described in my '706 patent, however, was directed to providing a frequency variation at either or both of the logical "0" and/or "1" to move the frequency of the data carrying system away from the frequencies of the natural background noise, so that the logic transmitted by the system is more easily detected.

Figure 5:
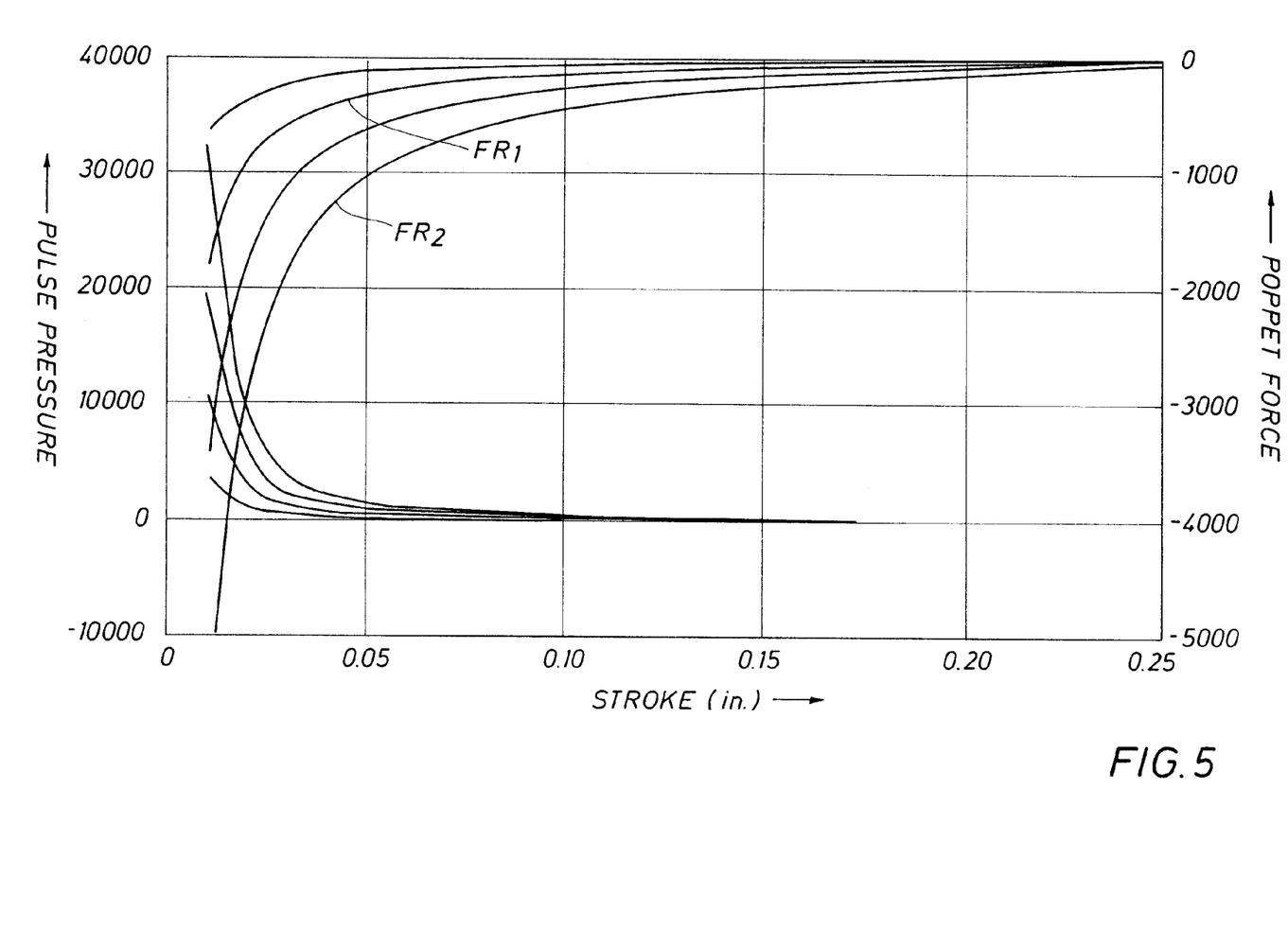
FIG. 5 is a graph of the force pressure relationship for various flow rates as a function of valve position for the downstream positive pulsers, shown in FIG. 1.

FIG. 5 illustrates typical relations between the force on the poppet of a pulser, the displacement of the poppet from the orifice and the resulting pressure drop across this poppet orifice pair as a function of the same displacement of FIG. 2. FIG. 5 shows the poppet force required to develop a particular pulse pressure is a parametric function of flow rate. The exact shape of these curves is controlled by the rate of momentum change in the fluid traversing the orifice which is controlled by the shape of the poppet and orifice. These illustrated curves are a subset of an infinite number of such curves for a variety of fixed flow rates as indicated by the designations FR1 and FR2 in FIG. 2. FIG. 5 also indicates that the required stroke length and the displacement of the poppet from the orifice necessary to achieve this given pressure excursion is also a parametric function of flow rate. This is relevant because wells are typically drilled with positive displacement pumps so that flow rate does not vary with a variation of circuit pressure around the fluid circuit. As can be readily discerned, for a variety of volumetric flow rates, approximately the same poppet force is require to attain a desired pulse pressure however this force is obtained at different displacements from the orifice. Therefore, the actual positions of the poppet relative to the orifice for both the on-pulse and off-pulse conditions will vary with flow rate. If the poppet force is set by the structure of the pulser then the pulse amplitude will be nearly constant over a range of flow rates. In the absence of this force the poppet will be driven away from the orifice. Therefore, by adjusting the force of insertion of the poppet into the orifice a given pressure drop can be obtained somewhat independent of the flow rate. A similar situation occurs when the poppet is located upstream of the orifice except the sense of force is reversed as the absence of this force will result in seating the poppet onto the orifice. This can be accomplished by matching either matching the bleed rate of the orifice 38 to the desired flow rate or by supplying a pressure relief valve 40. In the first case the pulse amplitude must be set for the minimum flow rate and any greater flow rate results in a higher pressure pulse and more rapid wear of the poppet and orifice. In the second case the pressure relief valve 40, wears at a high rate and during the course of a drilling well the valve characteristic may change sufficiently to inhibit pulser operation. In either case, the pulser will tend to wear out quickly. The present invention, in contrast, substantially increases the lifetime of pulser operation. This is accomplished by including an oscillation in the mud column that is above the frequency of the drilling noise reducing the required pressure excursions while still providing a detectable signal at the surface.

Figure 3:
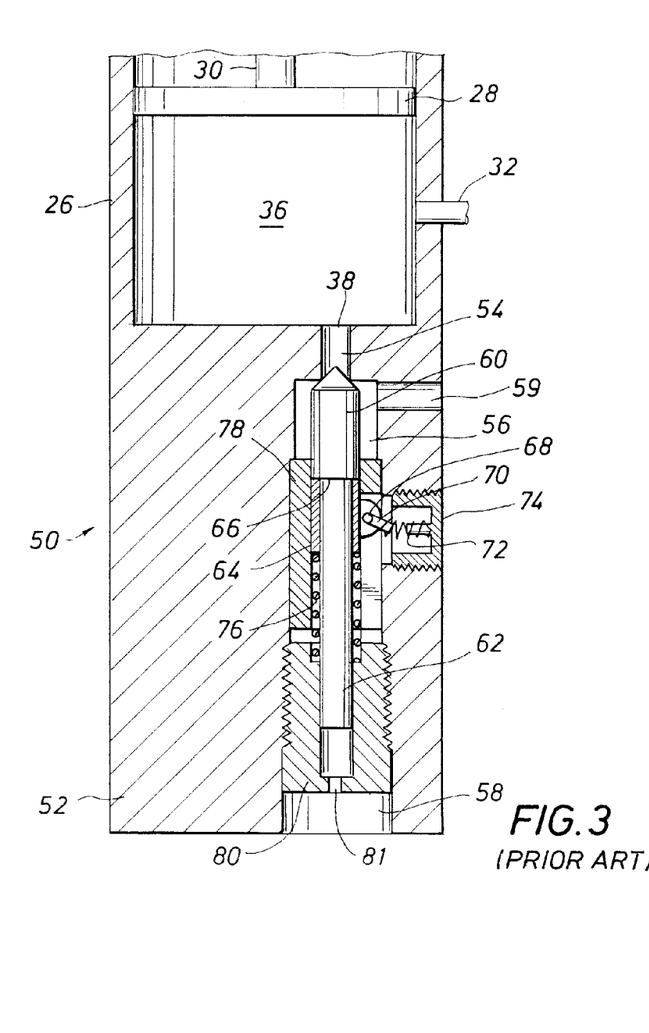
FIG. 3 is a sectional view of a bistable valve component from my '706 patent adapted to couple to or be formed as an integral part of the pulser of FIG. 2a, 2b, or 2c.
Figure 4:
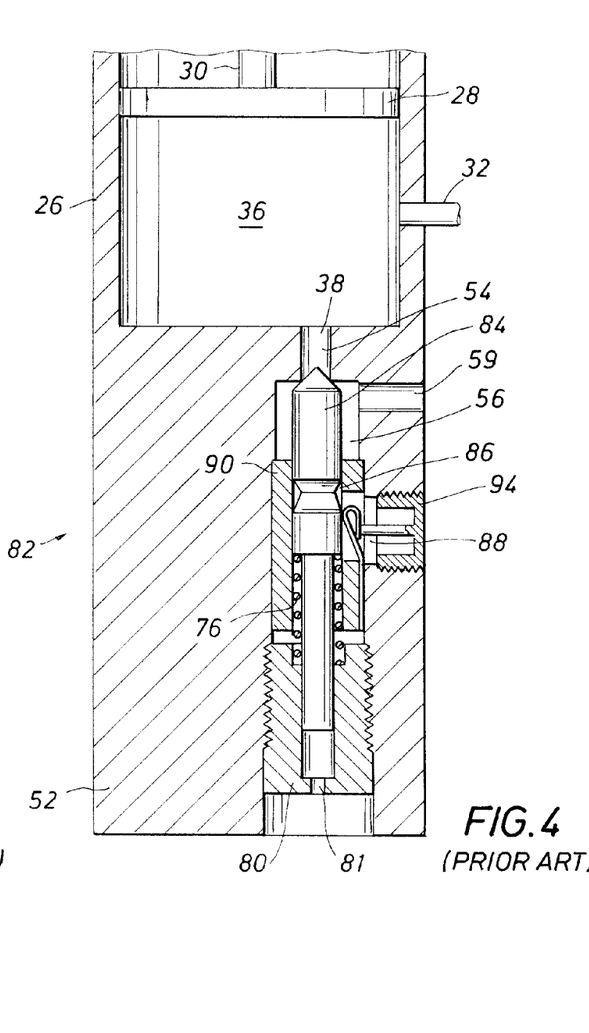
FIG. 4 is a sectional view of another preferred embodiment from my '706 patent of a tone unit of the present invention adapted to couple to or be formed as an integral part of the pulser of FIG. 2a, 2b, or 2c.

FIGS. 3 and 4 depict alternative structures for developing that frequency variation in the manner of a tone, as shown and described in my previous U.S. Pat. No. 6,867,706. Referring first to FIG. 3, the cylinder 26 receives the drive piston 28 which is coupled to the rod 30. A variable volume and pressure chamber 36 is enclosed by the cylinder and piston. In the present invention, a bistable valve 50 forms the other wall to enclose the chamber 36. The bistable valve 50 provides an oscillator which develops a time-varying pressure superimposed on the pressure pulse signal from the pulser.

The bistable valve 50 comprises a body 52, preferably cylindrical in cross-section, of the same diameter as the cylinder 26. The secondary opening 38 (see FIG. 2) comprises a bore 54 which feeds into a valve chamber 56. The valve chamber extends from the bore 54 the length of the body to an opening 58 and vents into the casing downstream of the cylinder 26 through a vent opening 59. Enclosed within the chamber 56 is an axially movable valve disk member 60 which is integrally formed with a valve stem 62. The valve disk member 60 seals against the bore 38 when in the position shown in FIG. 3. The stem 62 slidably receives a sleeve 64 which abuts against a shoulder 66 formed by the intersection of the disk member 60 and the stem 62.

Attached to or integrally formed with the sleeve 64 is a pivot 68. Attached to the pivot 68 is an elongate arm 70 which receives one end of a first spring 72. The other end of the first spring 72 is attached to a tension adjusting screw 74. In operation, as the disk member 60 moves axially back and forth, the arm 70 rotates about the pivot 68, under the control of spring action from the first spring, as further explained below.

The sleeve 64 rides against a second spring 76. The disk member 60, the sleeve 64 and the second spring all ride within an alignment sleeve 78. During operation, the alignment sleeve 78 remains stationary in relation to the body 52. The compression of the second spring 76 is controlled by the position of a set screw 80, which also receives the tail end of the stem 62. A vent hole 81 is provided to prevent hydraulic lock of the tail end of the stem 62. The adjustment of the set screw 80 determines the pressure within the chamber 36 at which the disk member 60 unseats from the bore 54. Thus, together, the first and seconds springs determine the frequency and amplitude of the pressure variations created by the axial movement of the disk member 60. Simple actuation of the bistable valve 50 allows the poppet 18 to oscillate between the pressure settings of the bistable valve.

Figure 6:
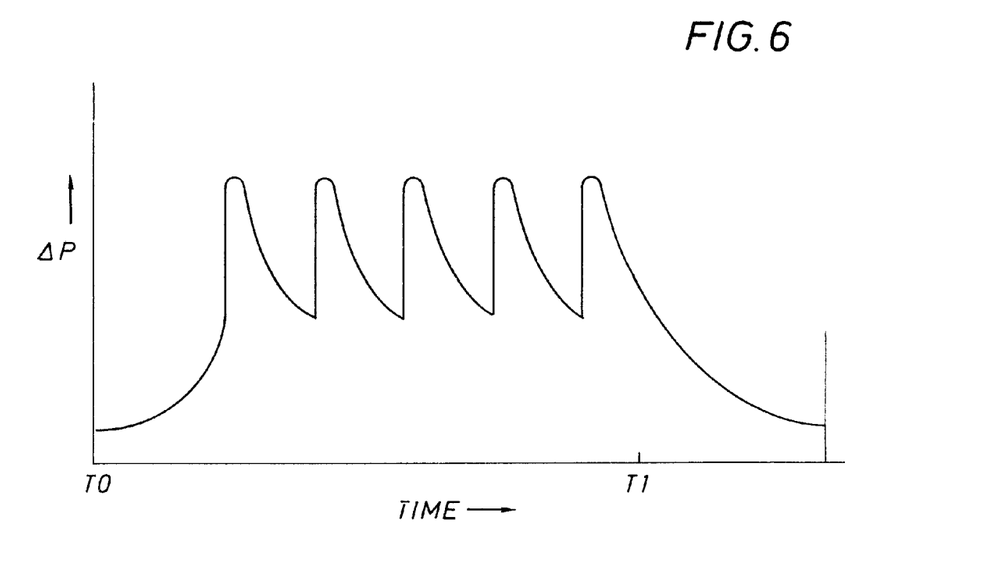
FIG. 6 is a plot of an upstream pressure waveform produced by the bistable valve component of the invention.

A typical wave form of the pressure signal created by the bistable valve is shown in FIG. 6. The ordinate of FIG. 6 is shown in terms of pressure differential, the absolute pressure will depend on the volumetric flow rate of the drilling fluid, and tension on the springs contained within the valve. As pressure in the chamber 36 exceeds the combined forces holding the bistable valve closed, the disk member unseats and toggles into the open position, the pressure in the chamber 36 drops rapidly, depicts as a rapid fall in the ΔP waveform. As pressure in the drive cylinder decreases the flow rate through the bistable valve decreases reducing the force on the face of the disk member. Spring pressure from the second spring then activates the toggle and shuts the bistable valve. The closed valve causes pressure in the drive cylinder to increase as flow rate into the drive cylinder is greater than the flow rate out of the drive cylinder and the drive cylinder inlet is at upstream pressure. This results in are generative pressure increase in the drive cylinder and a corresponding rapid increase in the waveform. This rise and fall in drive cylinder pressure creates a rapid oscillation of the poppet, which is coupled to the piston 28, alternately restricting and releasing the restriction of flow in the drilling fluid stream thus creating an oscillating pressure tone in the drilling fluid.

The frequency of these oscillations can be controlled by placing additional valves that control the volumetric rate of fluid flow in the circuit between the bore 54 through valve 50 and the drive cylinder 26. In the alternative, the frequency of theses oscillations can be controlled by replacement of the bistable valve with a valve controlling the rate of fluid flow through the fluid path into the drive cylinder. Such a valve can be a plug valve, a needle valve, another valve type with multiple fixed orifices, or a combination of valve types.

FIG. 4 depicts another bistable valve of the '706 patent, in this case a valve 82. The valve 82 accomplishes the same function as the valve of FIG. 3, and includes the same body 52 which forms a wall of the volume 36. It also includes the same second spring, 76, set screw 80, bore 54, chamber 56, and vent 59, which are numbered with the same reference numbers as in FIG. 3. A disk member 84 seals off the bore 54, as before, but has received a different reference number because the disk member includes a detent 86 adapted to receive a first spring 88. In this embodiment, the first spring comprises a leaf spring. The second spring 76 opposes movement of the disk member 84, as before, but the second spring 76 is retained by a sleeve 90 and a shoulder 92 of the disk member 84. The setting of the first spring is adjusted by an alien screw 94, while the set screw adjusts the tension of the second spring 76.

As described above, the bistable valves depicted in FIGS. 3 and 4 operate well over a wide range of mud flow rates, but tend to fail shut at very low flow rates. The present invention solves that problem by providing a valve 130 of FIG. 7. As with previous embodiments described above, the flow of drilling mud is from left to right as shown by an arrow 132 and it is to be understood that the valve 130 is positioned within a tubular and enclosed within a cylinder 26. The main poppet drive piston 28 is positioned within the cylinder 26, and is coupled to the main poppet through a piston rod 30.

The main poppet drive piston 28 may actually be part of the main poppet valve (See FIGS. 2a, 2b, and 2c). Higher pressure fluid is supplied through a gallery 134 for fluid entry into the chamber 36. The pressure of this fluid is a function of the pressure drop across the main orifice 16 (FIGS. 2a-2c) as the gallery 134 for fluid entry has its inlet upstream of the orifice 16. The rate that fluid is allowed to flow through the gallery 134 is one of the main components in the determination of the frequency at which the device operates. To insure that there is sufficient initial pressure drop, the spring 24 (FIG. 2a) may also be used to provide some upward force to the main poppet of the main poppet valve.

Figure 7:
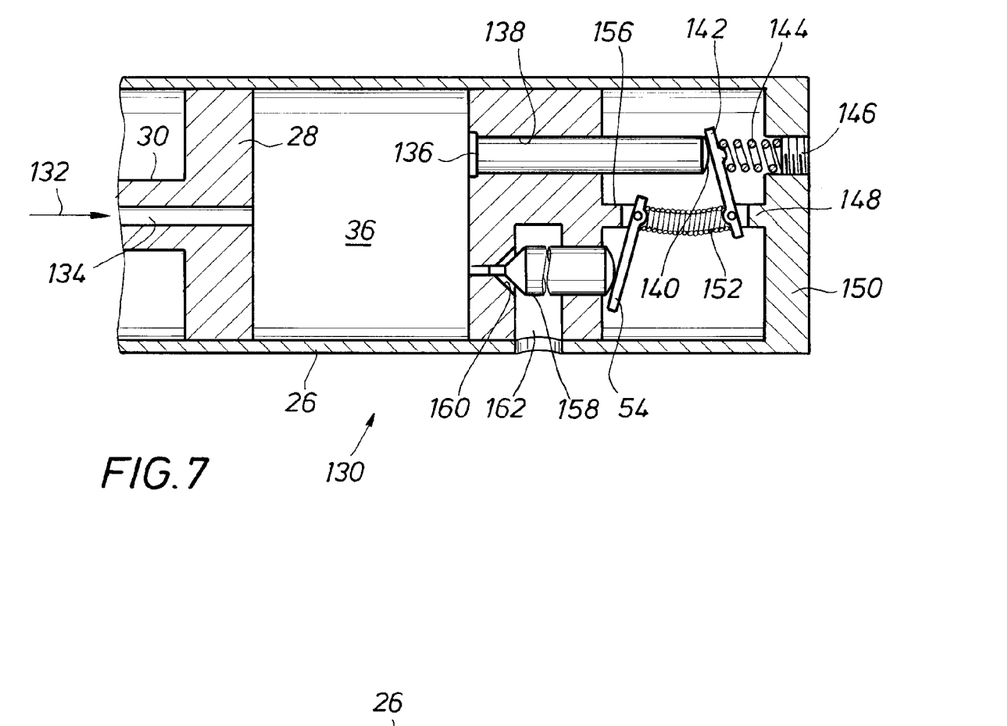
FIG. 7 is a sectional view of the bi-stable valve of the present invention with the toggle mechanism.

The gallery may also include a pilot valve (not shown) mounted to the left of the piston rod of FIG. 7 or the gallery may extend through the drive piston into the chamber 36 where the pilot valve can be located. The actual position of the pilot valve is not critical as long as the drive cylinder 28 is fed with higher pressure fluid from upstream.

Referring again to FIG. 7, the pressure within the chamber 36 is provided to a pressure sense piston 136. Those of skill in the art will recognize that other elements may be used, other than a piston for sensing the pressure within the chamber 36, such as a diaphragm, a bellows, or equivalent means for sensing the pressure so long as displacement of the sense element is developed from the chamber pressure. The sense piston 136 slides within a channel 138 and terminates in a butt end 140.

The butt end 140 of the sense piston 136 rides against a first toggle arm 142, which pushes back against the butt end 140. The strength of the resistance of the first toggle arm is determined by a relieve pressure spring 144 which is adjusted by a relief pressure adjustment screw 146. Moving the relief pressure adjustment screw 146 to the left places greater pressure on the spring 144, and thus greater pressure on the sense piston, thereby increasing the pressure at which the sense piston will move full stroke to the right as seen in FIG. 7.

The first toggle arm levers back and forth with its fulcrum on a first pedestal 148. The first pedestal 148 is preferably mounted to the inside surface of a cylinder end cap 150. At the first pedestal 148 on the outside of the first toggle arm is a toggle spring 152. Means other than the coil toggle spring may be used, such as for example a Bellville (leaf) spring or the like. The opposite end of the toggle spring terminates at the outer surface of a second toggle arm 154. Note that the toggle spring is shown in FIG. 7 with its bulge in a downward direction. As explained further below, the toggle spring will toggle during operation of the present invention and the bulge will be in an upward direction.

The second toggle arm levers back and forth with its fulcrum on a second pedestal 156. The inner surface of the second toggle arm 154 ride against a bistable valve element 158. The bistable valve element 158 is shown in FIG. 7 slightly off its seat 160 for illustration purposes.

Moving the bistable valve element 158 off its seat opens a vent path from the chamber 36 to an exhaust port 162. This bleeds the pressure out of the chamber 36, thereby moving the piston 28 to the right as seen in FIG. 7.

Thus, the arrangement of FIG. 7 assures a positive closure of bistable valve element, driven by a toggle, and tripped by a sense piston. By eliminating early leakage of the valve used to relieve the drive cylinder pressure and then abruptly opening the secondary valve, a consistent operation is obtained across a wider range of flow rates, compared to the devices illustrated in FIGS. 3 and 4.

Consider the valve immersed in a conduit like those shown in FIGS. 2a-2c and containing a source of fluid located to the left and flowing in the direction shown by the arrow 132. Fluid enters the gallery 134 to the left upstream of the main poppet valve 18. The spring 144 insures that the sense piston 136 is biased to the left toward the chamber 36. It should be recognized that the sense piston need not be directly and axially exposed to the chamber 36, only that the pressure within the chamber be sensed by a sense element, here the sense piston.

With the sense piston responding to low pressure, the toggle mechanism comprising the toggle arms and toggle spring forces the bistable valve element shut. This closure allows the pressure in the chamber 36 to increase, thereby forcing the main poppet drive piston 28 to the left, thereby actuating the main poppet valve and regeneratively increasing the pressure within the chamber 36 since the inlet to the gallery 134 is upstream of this valve. The increase in pressure in the chamber also moves the sense piston against the reactive force set by the spring 144 and the relief pressure adjustment screw 146.

At a predetermined pressure within the chamber 36, displacement of the sense piston allows the toggle spring to set to the inverted condition (i.e. the bulge moves up) which allows the bistable valve element to open. Opening this element exposes the fluid within the chamber 36 to pressure downstream of the main poppet valve through the exhaust port 162 and allows the main poppet drive piston to move to the right into the chamber 36. This action opens the main poppet valve and reduces the pressure at the upstream end of the gallery 134 for Fluid Entry. This reduction in pressure is then sensed by the piston 136, thereby moving the piston 136 to the left, repeating the cycle process.

The configuration thus shown and described has several advantages over the devices of FIGS. 3 and 4. This device works with lower flow rates than the other devices with the toggle mechanism assuring a positive seat for the bistable element. Furthermore, modulation of the flow rate through the gallery controls frequency and does not require shear of the flow stream by a pilot valve. This feature of the invention reduces the required pilot valve activation energy. Also, by interrupting the sense element the device can be held in the 'on pulse' or 'off pulse' condition with expenditure of very little activation energy. This feature facilitates construction of a mechanical equivalent of an electronic 'gated oscillator' with the ability to close the gate at either high pressure drop or low pressure drop. Finally, the configuration with both a pilot valve and the ability to interrupt the sense element facilitates much higher order coding. It is therefore easy to implement a base 4 code with two states for the sense element and three states for the sense element interrupter.

Figure 8:
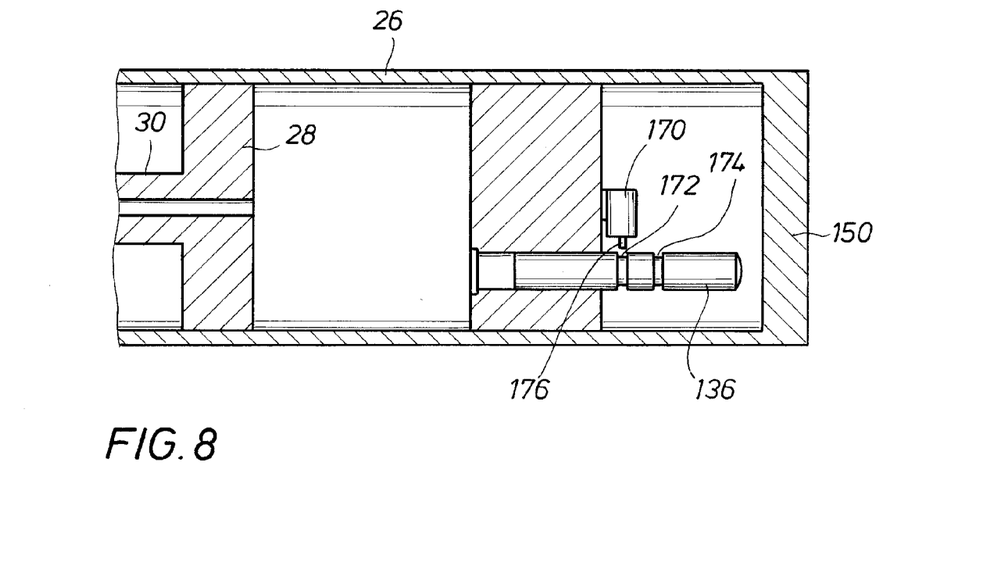
FIG. 8 is a top sectional view of the bi-stable valve of the present invention including a latch mechanism.

FIG. 8 depicts another feature of the invention including a latch mechanism. The latch mechanism may be included with the sense piston, if that is what is used, or other means for holding the toggle mechanism stationary. The latch mechanism is housed within the cylinder 26, as previously described. In the preferred embodiment, the latch mechanism is preferably actuated by a solenoid 170 which may be powered in a conventional manner. The solenoid is positioned adjacent the sense piston 136, which includes a first position detent 172 and a second position detent 174. One may also include a single detent, if desired, to hold the sense piston in an off position. If two detents are used, as preferred, more logic states are enabled. In either case, the solenoid includes a shaft extending toward the detent(s) to engage them and thereby inhibit motion or the sense element, in this case the piston.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

What is claimed is:

1. A transmitting element in a flowing fluid comprising:
   a. a pulser including:
      i. a first chamber for enclosing a flow of fluid;
      ii. a second chamber within the first chamber defined by a driver piston;
      iii. a poppet coupled to and driven by the driver piston for regulating the flow in the first chamber; and
   b. a bistable valve assembly between the second chamber and an outlet port, the bistable valve assembly comprising:
      i. a bistable valve element;
      ii. a sense element sensing the pressure within the second chamber; and
      iii. a toggle mechanism actuated by the sense element for determining a first position for the bistable valve at a lower pressure with the second chamber and a second position for the bistable valve element at a higher pressure within the second chamber.

2. The transmitting element of claim 1, further comprising a latch to inhibit activation of the sense element.

3. The transmitting element of claim 1, wherein the sense element is a piston.

4. The transmitting element of claim 3, further comprising a latch to inhibit movement of the piston.

5. The transmitting element of claim 4, wherein the latch comprises:
   a solenoid positioned adjacent the piston with a shaft extending toward the piston; and
   a first detent on the piston adapted to engage the shaft.

6. The transmitting element of claim 5, further comprising a second detent on the piston spaced apart from the first detent.

7. The transmitting element of claim 1, wherein the toggle mechanism includes a coil spring toggle.

8. The transmitting element of claim 1, wherein the toggle mechanism includes a leaf spring toggle.

9. The transmitting element of claim 1, further comprising:
   a piston rod coupling the driver piston to the poppet; and
   a gallery through the piston rod from a point upstream of the orifice into the chamber.

* * * * *